Dec. 18, 1962 M. J. GARVEY ET AL 3,068,986

SKIP TAB MECHANISM FOR ACCOUNTING MACHINES

Filed Jan. 23, 1961 6 Sheets-Sheet 1

INVENTORS
MARK J. GARVEY &
ARTHUR HARTVIG

BY Louis A. Kline
Wilbert Hawk, Jr.
THEIR ATTORNEYS

SKIP TAB MECHANISM FOR ACCOUNTING MACHINES

Filed Jan. 23, 1961 6 Sheets-Sheet 2

INVENTORS
MARK J. GARVEY &
ARTHUR HARTVIG
BY Louis A Kline
Wilbert Hawk, Jr.
THEIR ATTORNEYS

SKIP TAB MECHANISM FOR ACCOUNTING MACHINES

Filed Jan. 23, 1961 6 Sheets-Sheet 3

INVENTORS
MARK J. GARVEY &
ARTHUR HARTVIG
BY Louis A. Kline
Wilbert Hawk, Jr.
THEIR ATTORNEYS Dec. 18, 1962 M. J. GARVEY ET AL 3,068,986
SKIP TAB MECHANISM FOR ACCOUNTING MACHINES
Filed Jan. 23, 1961 6 Sheets-Sheet 4
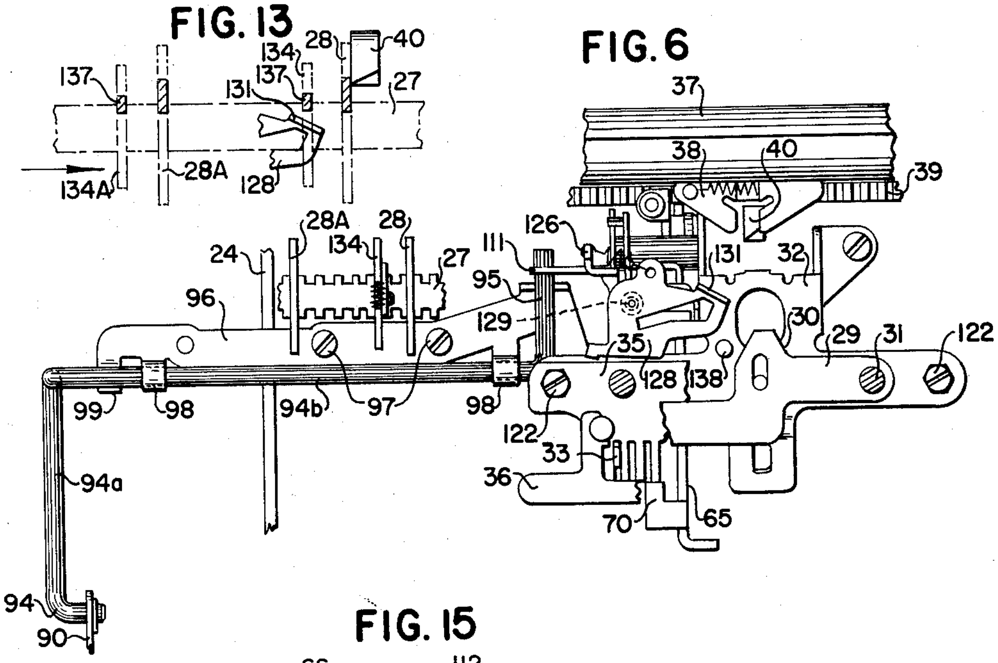
FIG. 13, FIG. 6
FIG. 15
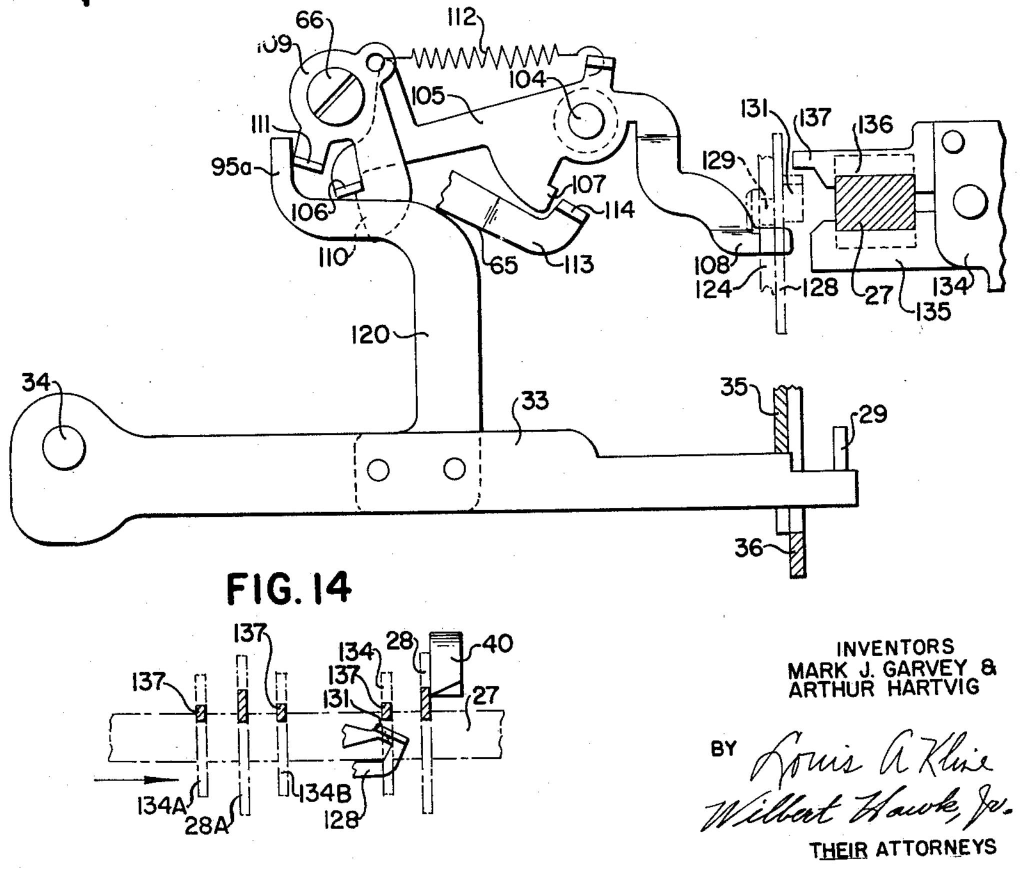
FIG. 15, FIG. 14
INVENTORS
MARK J. GARVEY &
ARTHUR HARTVIG
BY Louis A Kline
Wilbert Hawk, Jr.
THEIR ATTORNEYS INVENTORS
MARK J. GARVEY &
ARTHUR HARTVIG
BY Louis A Kline
Wilbert Hawk, Jr.
THEIR ATTORNEYS INVENTORS
MARK J. GARVEY &
ARTHUR HARTVIG
BY Louis A Kline
Wilbert Hawk, Jr.
THEIR ATTORNEYS

United States Patent Office 3,068,986

Patented Dec. 18, 1962

3,068,986

SKIP TAB MECHANISM FOR ACCOUNTING MACHINES

Mark J. Garvey and Arthur Hartvig, Ithaca, N.Y., assignors to The National Cash Register Company, Dayton, Ohio, a corporation of Maryland Filed Jan. 23, 1961, Ser. No. 84,311
9 Claims. (Cl. 197—177)

This invention relates generally to accounting machines, including such types of machines commonly referred to as "calculating machines" and "bookkeeping machines," and, more particularly, relates to improved mechanism thereof enabling the selective skipping, during machine operation, of various digit-entering columns contained on record materials inserted into the machine.

In the one particular embodiment of the present invention as herein illustrated and described, the accounting machine is of the type shown generally in the United States Letters Patent Nos. 2,692,726 and 2,813,611, which issued, respectively, on October 26, 1954, and November 19, 1957. Reference may be had to these patents for a complete disclosure of machine mechanism which is not pertinent to the present invention and which, for that reason, will not be described or illustrated herein.

These typical machine constructions are provided with both semi-automatic and automatic cross-tabulating paper carriages which, in accordance with the selective positioning of various machine function control stops along a control bar thereof, cause debit and credit transactions to be printed in particular columns of a sheet of record material. As set out in detail in the above-mentioned reference patents, and as described generally hereinafter, upon the cross-tabulation movement of the paper carriage, each of its function control stops comes into contact with a machine-carried tabulating finger not only for stopping the carriage at the various columnar positions of the record material, but also for conditioning machine mechanism for performing specific types of accounting functions at such positions of the carriage. Thus, a specific control stop is provided on the control bar for each of the columns of the particular record material being employed, thereby stopping the carriage at its respective record material column and conditioning the machine for a particular type of operation to be initiated thereat.

In some instances, however, it is many times desirable to skip one or more of the columns of the record material sheet, as, for example, when the accounting operation does not include a digit amount to be entered in such column or columns. The instant invention is directed at these instances in order that, without change of the original positioning of each of the control stops along the control bar, a succeeding column or columns may be selectively skipped by means of depression of a mortorized skip control key instead of the add control key (or what is commonly called the "add motor bar") following the setting-up on the machine keyboard of the digit amount to be entered into the machine and recorded at the record material column next preceding the column or group of columns of the record material to be skipped.

Since it is desirable to maintain the initial positioning of the machine function control stops along the control bar of the shiftable paper carriage, which control stops position the carriage for columnar printnig of specific data included in the various machine operations performed at the columnar positions, it is a primary object of the present invention to provide means for initiating a machine operation at any one of the record material columnar positions, while causing the tabulating finger to be retained thereby in an effective position in relation to succeeding control stops as it is actuated for releasing the control stop which it is then engaging.

A further important object of the invention resides in means for releasing and restoring the tabulating finger from its ineffective position to its effective position after the desired column or columns of the record material have been skipped.

A still further important object of the invention is the provision of means enabling the tabulating finger to be restored to its effective position when released from its ineffective position after the predetermined column or columns of the record material have been skipped, even though the machine-operation-initiating means is maintained in an operated condition by the machine operator.

With these and incidental objects in view, the invention includes certain novel features of construction and combinations of parts, a preferred form or embodiment of which is hereinafter described with reference to the drawings which accompany and form a part of this specification.

In the drawings:

FIGS. 1A and 1B, together, constitute a view in elevation of the right side of an accounting machine embodying the present invention, with particular reference to the improved mechanism thereof located on the outside of the right vertical frame plate;

FIG. 2 on the sheet containing FIG. 1A, is an enlarged fragmentary view, in top plan, of the forward portion of the machine mechanism illustrated in FIG. 1A;

FIG. 3, on the sheet containing FIG. 1B, illustrates an upper portion of a typical record material sheet used in the machine employed in the instant invention;

FIG. 6 is a fragmentary view of the accounting machine as seen from the rear, showing a portion of the paper carriage control mechanism, and including a portion of each of the tabulating finger retaining and restoring mechanisms;

Figures 1A, 2:
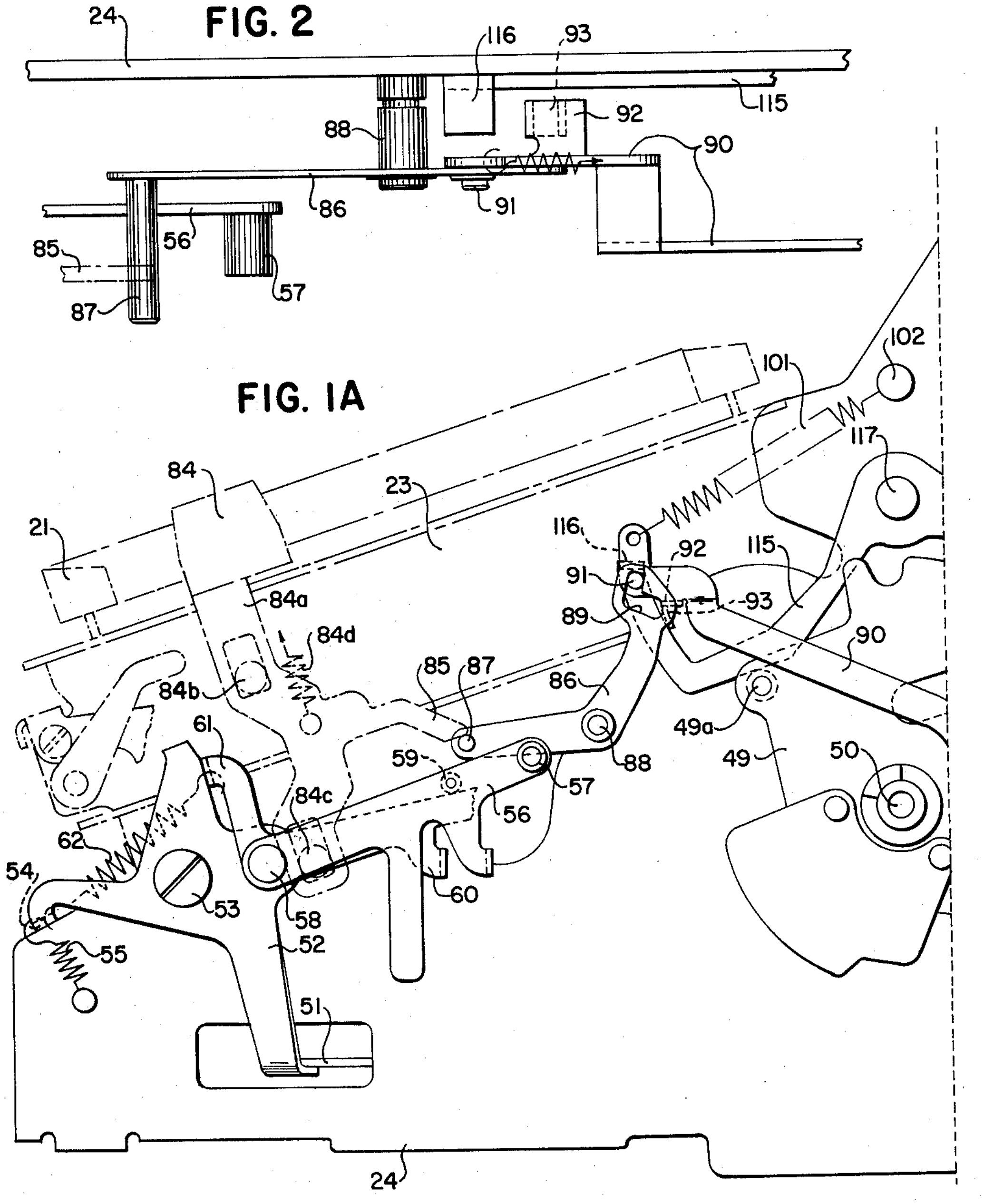
Figures 1B, 3:
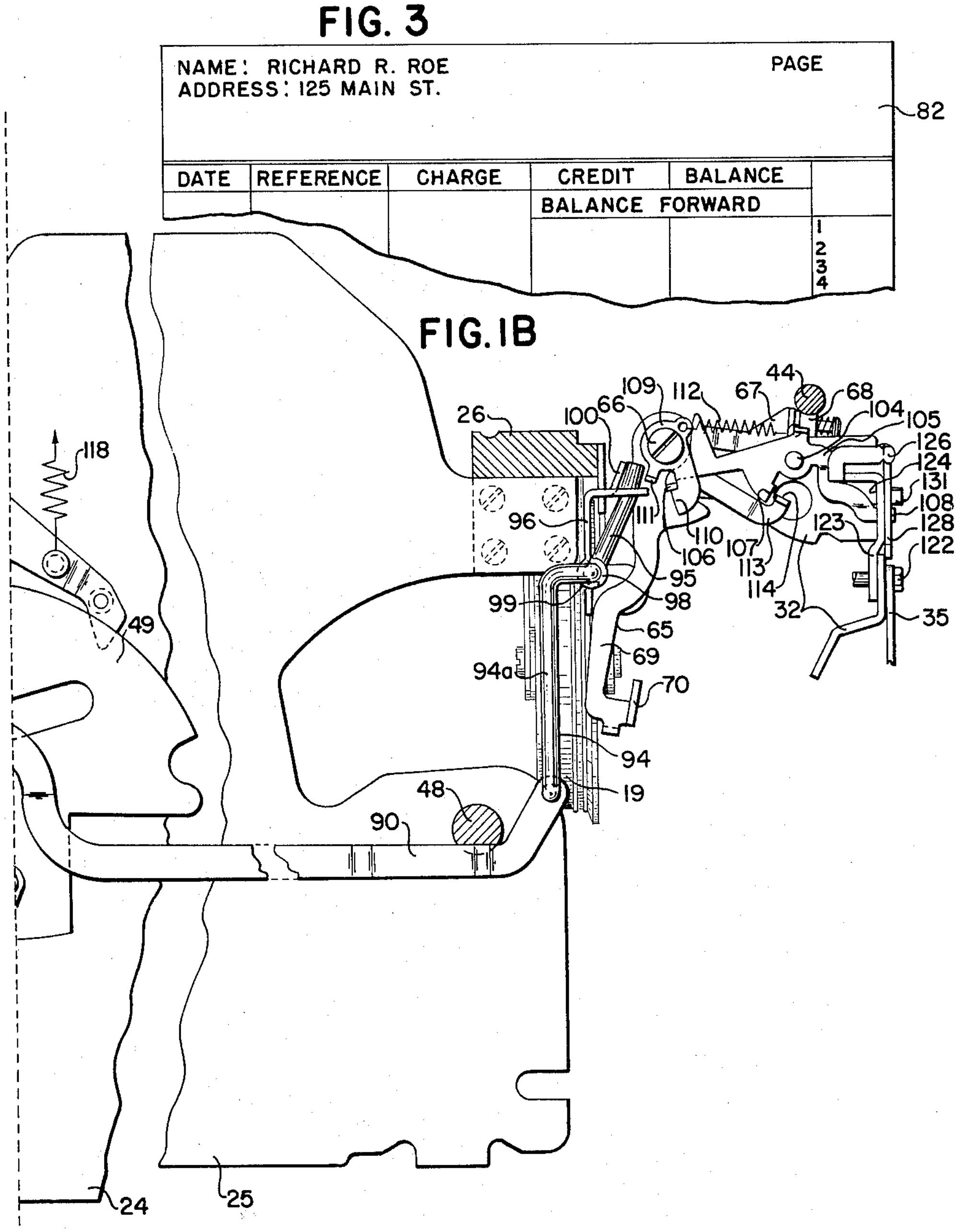
Figures 7A, 7B, 8A, 8B, 9A, 9B:
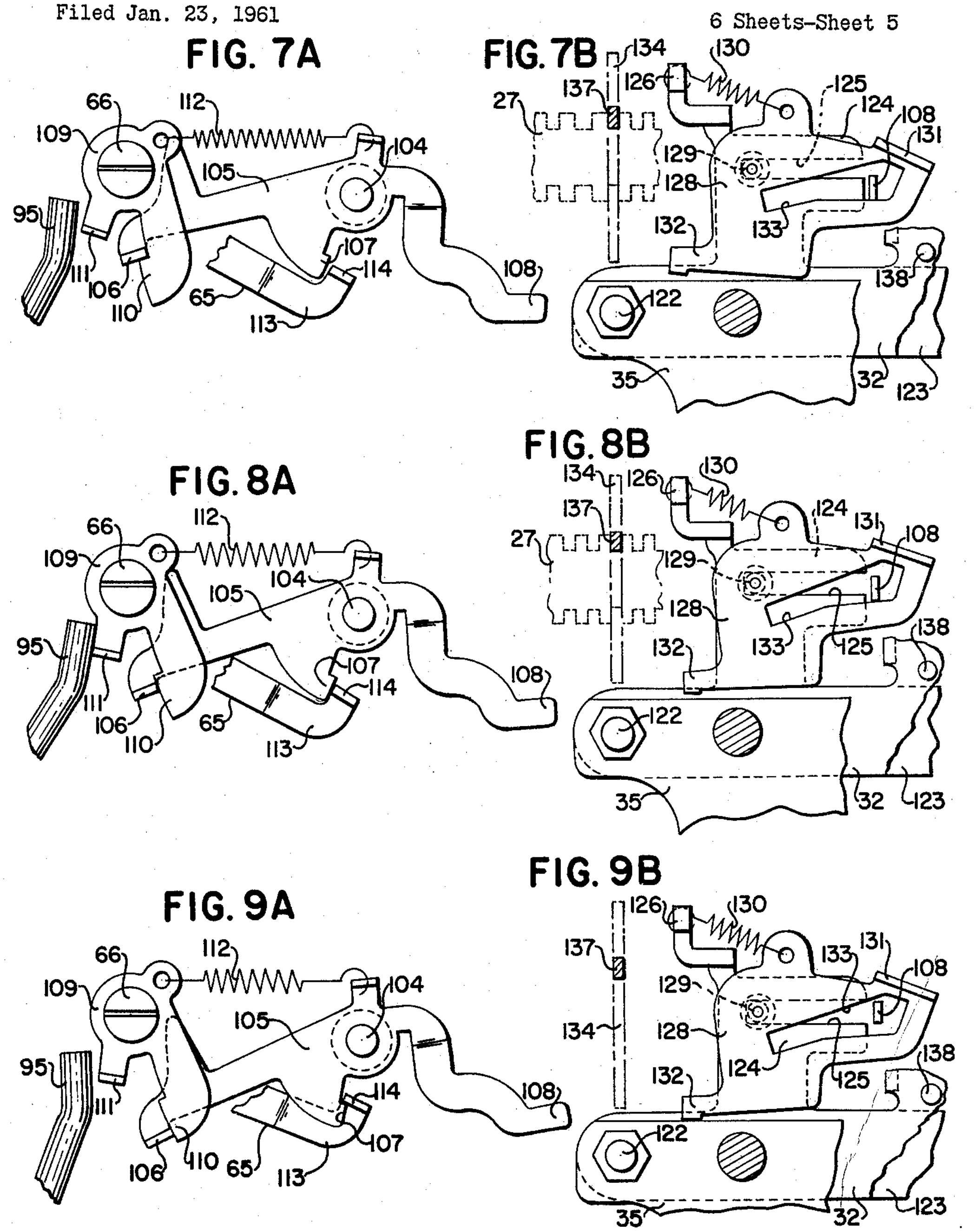
FIG. 7A is a detail on an enlarged scale, in right side elevation, of a portion of the tabulating finger ineffective position retaining mechanism as positioned at home, or prior to the initiation of a machine cycle by the improved mechanism of FIGS. 1A and 1B.
FIG. 7B is a detail, in rear elevation, of the tabulating finger restoring mechanism as positioned when the retaining mechanism is at home, as illustrated in FIG. 7A.
FIG. 8A is a detail similar to FIG. 7A, but showing the retaining mechanism thereof as moved immediately upon the initiation of a machine cycle by the mechanisms of FIGS. 1A and 1B.
FIG. 8B is a view similar to FIG. 7B, but showing the restoring mechanism thereof as moved along with the retaining mechanism of FIG. 8A.
FIG. 9A is a detail similar to FIG. 8A, but showing the mechanism thereof as moved to a tabulating finger latching position during a machine cycle initiated by the improved mechanism.
FIG. 9B is a detail similar to FIG. 8B, but showing the mechanism thereof as positioned when the tabulating finger is latched in its ineffective position by the retaining mechanism of FIG. 9A.

FIG.13, on the sheet containing FIG. 6, is a diagrammatic representation of control bar programming to enable selective skipping of the paper carriage columnar position next succeeding any given columnar position of the carriage;

FIG. 14, on the sheet containing FIG. 6, is a diagrammatic representation of control bar programing for preventing the selective skipping of any one of the paper carriage columnar positions succeeding any given columnar position of the carriage; and FIG. 15, also on the sheet containing FIG. 6, is a detail, in right side elevation, of the tabulating finger retaining mechanism of FIG. 7A, but showing an actuating mechanism therefor which is modified from that illustrated in FIGS. 1A and 1B.

*General Machine Structure and Operation*

As admirably set out in each of the reference United States patents to Frieberg and Larsen, Nos. 2,692,726 and 2,813,611, the accounting machine embodying the instant invention includes the usual housing or casing 20 (FIG. 5), through which extends the usual keyboard of digit and reference keys 21, along with a cycle-initiating member commonly referred to as an add-control key or motor bar 22. In the usual manner, the digit and reference keys 21 are carried by a key frame unit 23 (FIG. 1A), attached to the machine proper, while the motor bar 22 is carried by a key frame unit (not shown herein) secured to the inner, right-hand surface of the housing 20, being thus removable from the machine construction along with such housing.

Figure 4:
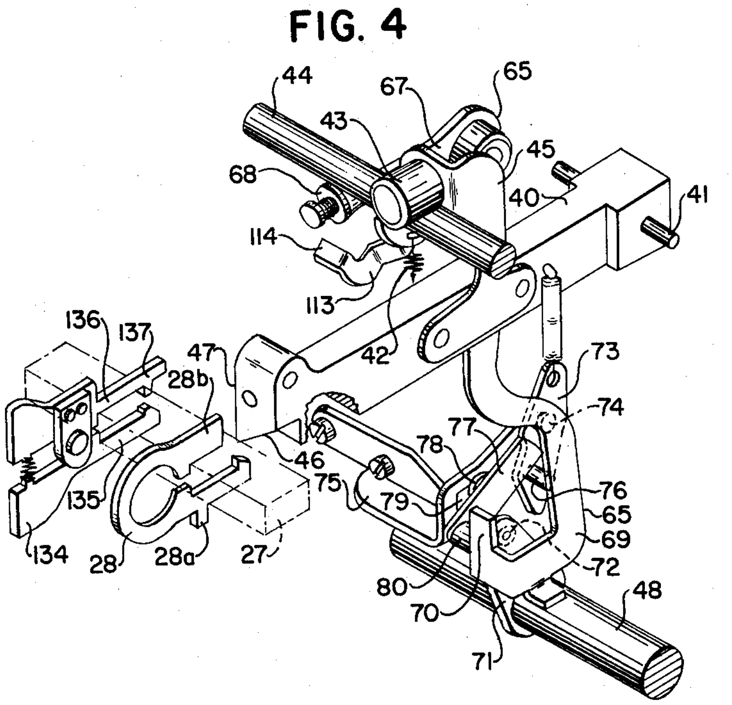
FIG. 4 shows the usual mechanism for releasing the tabulating finger from engagement with its associated control stop during each machine operation, such view being in perspective, on an enlarged scale, and including a portion of mechanism for restoring the tabulating finger to its effective position when it is maintained by the retaining mechanism in its ineffective position.

As adequately illustrated and described in the reference United States Patent No. 2,813,611, the great bulk of mechanisms employed in such a machine construction is carried between right and left vertical frame plates 24 and 25, which frame plates, in addition to other means (not shown herein), are secured one to another in spaced relation by a paper carriage support rail 26, extending across the rear end portions thereof (see FIG. 1B). The usual paper carriage of either of the reference patents, of which specific details only are illustrated in FIG. 6, is slidingly supported by the rail 26 (United States Patent No. 2,813,611) or by a cross rod, not illustrated herein (United States Patent No. 2,692,726), and may be moved therealong by several means, one of which is the usual spring reel 19 (FIG. 1B), which constantly urges the carriage to the left in the conventional way. As seen in FIG. 6, which contains the essential portion of the carriage structure illustrated in detail in FIG. 10 of the United States Patent No. 2,813,611, and in FIG. 6 of the United States Patent No. 2,692,726, the paper carriage has a machine function control bar 27 extending thereacross, on which bar 27 any number of control stops 28 may be selectively positioned, one from another, and secured thereto, for controlling the columnar positions of the carriage during machine operation, as well as controlling the particular type of machine operation to be performed for each columnar position. As seen in FIG. 4, each of these control stops 28 may be provided with an abutment, such as the downwardly-extending ear 28*a*, for contacting a cam edge 30 of an associated type of operation interponent 29, which (FIG. 6) is rockably mounted on a shaft 31 of a bracket member 32, secured to the rear of the machine at a zone intermediate the vertical frame plates 24 and 25. As seen in both FIGS. 6 and 15, upon such contact of the moving control stop 28 with the cam surface 30, the interponent 29 is rocked counter-clockwise thereby to rock an associated type of operation control lever 33 clockwise (FIG. 15) about its pivot 34. Upon such rocking of the control lever 33, mechanism associated therewith is actuated for conditioning the machine to perform a specific type of operation, such as a non-add, an add, a subtract, a sub-total, or a total operation at the various columnar positions of the carriage. Mechanism may also be associated with such control lever 33 for providing automatic initiation of a machine cycle as the carriage reaches its columnar position. Looking further to FIGS. 6 and 15, it is seen that the illustrated control lever 33 extends rearwardly from its pivot 34 to extend freely through a guide comb 35 and over an over-throw stop carriage control plate 36, secured to the bracket member 32, and has its rearmost end portion in engagement with the free end portion of the interponent 29. This structure, as well as a rear-rockable paper table 37 (a fragmentary rear end portion of which is illustrated in FIG. 6), a by-pass cam pawl 38, and the usual rack 39 extending across the rear of the machine (a central portion of which is illustrated in FIG. 6), is illustrated and described in detail in the reference United States Patent No. 2,813,611, while portions only of such members have been included in FIG. 6 hereof to associate the relationship of such parts of the figure with those parts as illustrated in FIG. 10 of the reference patent.

Extending over the control bar 27 is a tabulating finger 40 (see FIG. 4), mounted on a horizontal pin 41, so that its rear end may move up and down with relation to the control bar and is normally urged toward such control bar by a spring 42, but may be moved away from it in response to the urge of tabulating mechanism to be described. The pin 41 is supported in a bracket extending downwardly from the paper carriage support rail 26 (FIG. 1B). The rear end of the tabulating finger is kept from actually striking the control bar 27 by a roller 43, resting on a bail 44, such roller 43 being carried by an upstanding bracket 45, attached to the tabulating finger 40, so that the paper carriage may move unrestricted to the left unless prevented by one of the control stops 28 positioned along the control bar 27. As further seen in FIG. 4, the rear end of the tabulating finger 40 has a beveled surface 46, which allows free return of the paper carriage to the right over any machine function control stop 28 except a terminal stop, as set out fully in United States Patent No. 2,813,611. In controlling the positioning of the paper carriage as it is constantly urged to the left by the above-mentioned spring reel, a stop surface 47 of the tabulating finger 40 is struck by the upper arm 28*b* of any of the intervening stops 28 to bring the carriage to a halt. If the rear end of the tabulating finger 40 is lifted, the paper carriage will proceed to the left under the urge of the spring reel either until such finger is lowered for engaging the upper arm 28*b* of the next control stop 28, or until it comes to the terminal stop, having an extremely wide upper arm for stopping the carriage at its extreme leftward movement, as described in the reference patent. The normal raising and lowering of the tabulating finger 40 is performed during each machine operation in order that the paper carriage may move from one columnar position to the next. The mechanism for so raising and lowering the tabulating finger will soon be described.

Although not specifically illustrated herein, in view of the complete disclosure contained in each of the reference patents, the accounting machine is driven by an electric motor, which causes a rear drive shaft 48 to oscillate first counter-clockwise and then clockwise back to its home position (FIG. 1B), and in the reverse direction as seen in FIG. 4. Through the usual link connecting such rear drive shaft 48 with the full-stroke sector 49, the machine's main operating shaft 50 (FIG. 1A) is given a like oscillating movement. As usual, energization of the machine motor is provided through a switch member, associated therewith, which becomes closed as a trip latch is rocked to an ineffective position either upon the depression of the machine motor bar 22 (FIG. 5) or upon the setting of initiating mechanism by the rocking of the control lever 33 (FIG. 15) as the carriage is shifted to a particular columnar position. For initiating a machine operation through depression of the add motor bar 22, such trip latch is connected to the usual trip lever, which has a link 51 extending therefrom toward the front of the machine. As seen in FIG. 1A, the forward end of the link 51 is pivoted to the lower arm of the machine main trip lever 52, pivoted to the machine right vertical frame plate 24 by a pivot stud 53. The forwardly-extending arm of the lever 52 has an ear 54, which is yieldingly held against the right vertical frame plate 24 by a spring 55, thus urging the link 51 constantly rearwardly for retaining the motor switch in its open condition. In the manner set out in United States Patent No. 2,692,-726, the machine operation is initiated by depression of the add motor bar 22 (FIG. 5), which bears down on a roller 57 (FIGS. 1A and 2) on a rearwardly-extending lever 56, pivoted at 58 to the main trip lever 52. An inwardly-directed stud 59 of the lever 56 rests on the upper surface of a yielding trip lever 60, which is also pivoted to the lever 52 at pivot 58 (FIG. 1A) and which has an upwardly-extending arm portion 61 resting against the rear edge of the lever 52. By means of a spring 62, stretched between the arm portion 61 and the ear 54 of the trip lever 52, such yielding trip lever 60 becomes, for normal machine operations, a rearwardly-extending arm of the main trip lever 52. The result is, as the add motor bar 22 presses down on the roller 57, that the lever 56 is rocked clockwise thereby, and, through its inwardly-directed stud 59, the yielding lever 60 and the interconnected main trip lever 52 are carried therewith for pulling the link 51 forwardly to initiate the normal cycle of machine operation. Although not specifically illustrated and described in any detail herein, a subtract control key is likewise carried by the typical machine constructions, as disclosed in the reference patents. The depression of such key also causes the main trip lever 52 to be rocked for initiating a subtract type of machine operation. As the machine is cycled in each instance, the rear drive shaft 48 is given its above-mentioned oscillating movement.

As described above in relation to FIG. 4, the roller 43 extends over the bail 44 (hereinafter referred to as a tabulating finger release bail 44), which is pivotally mounted by right and left arms carried by the paper carriage side plates. Again, in view of the complete disclosure of United States Patent No. 2,813,611, such arms and plates are not illustrated in this application. A bell crank lever 65 (FIG. 4), pivoted on a shoulder screw 66 (FIG. 1B), extending outwardly to the right from the machine rear bracket member 32, has a rearwardly-extending upper arm 67, carrying a roller member 68, positioned under the tabulating finger release bail 44, and a downwardly-extending arm 69, having a rearwardly- and upwardly-projecting portion 70. On the rear drive shaft 48 is a cam arm 71, having on its outer end a stud 72, which strikes a by-pass pawl 73, pivoted on a stud 74 on a bracket 75, secured to a back cross-brace of the machine (such cross-brace not being shown herein). As the machine cycles, in the first half-cycle, the stud 72 on the cam arm 71 by-passes the pawl 73, the latter rocking counter-clockwise (FIG. 4) around its pivot stud 74, and, on the return stroke of the machine, such pawl 73 is rocked clockwise by the return movement of the cam arm 71. During such movement of the pawl 73, a stud 76 thereon strikes the upper rear end of a lever 77, having a stud 78, which rides in a slot 79 in the bracket 75, urging said lever 77 rearwardly and forcing a rearmost stud 80 thereof to push rearwardly on the upwardly-extending portion 70 of the bell crank lever 65 and rock it clockwise about its pivot screw 66. As the bell crank lever 65 is so rocked, its roller member 68 raises the tabulating finger release bail 44, which bail, through the roller 43, carried by the bracket 45, raises the rear end of the tabulating finger 40 to free the paper carriage for movement by the above-mentioned spring reel to the next machine function control stop 28, with the aforesaid parts moving immediately back to normal tabulating finger effective position as soon as the stud 72 on the cam arm 71 has passed on by the by-pass pawl 73 near the end of each cycle of machine operation.

With such machine construction, which construction is old in the art in view of the reference patents herein referred to, as well as in view of numerous other earlier patents disclosing particular details thereof, it is seen that the accounting machine may be employed for performing numerous bookkeeping operations which constitute a large part of the work load of most going businesses. In accordance with the positioning of the control stops 28 along the control bar 27, the machine paper carriage, during its tabulating operation from right to left, is stopped at various columnar positions provided on the record material sheet inserted into the machine. A typical example of such a record sheet is illustrated in FIG. 3, where a customer account record sheet 82 contains the usual data-recording columns for the date of entry (which is normally printed from a date printer carried by the machine); the customer reference, such as his assigned account number (which is recorded on the record sheet under a non-add type of machine operation); the charges for purchases made by the customer (which column receives a printed amount during a debit type of machine operation initiated by the add motor bar 22); the items returned by or credit given to the customer (which column receives negative amounts entered into the machine under control of its subtract control key); and a balance of the transactions between the customer and the concern making out the record sheet (which balance is the result of the debit and credit items entered into the machine, as read from its totalizer mechanism under control of either the sub-total control key or the total control key provided on the machine). With such a record sheet 82, it is apparent that five control stops 28 may be placed on the control bar 27 to position the carriage for each of the data-recording columns, and that a final control stop may be placed on such bar 27 at a zone to the right of the balance column, in order that the paper carriage will be automatically returned to the date column at the end of each line of machine operations (see reference United States Patent No. 2,813,611 for details of such final control stop and the particular machine structure for returning the carriage automatically to its starting position).

As mentioned above, during the particular machine operation performed at each of the columnar positions of the record material sheet 82, the tabulating finger 40 (FIG. 4) is raised near the end of the machine operation and then is lowered at the very end of the operation, so that the paper carriage may be spring-urged from the carriage-positioning control stop 28 to the next control stop thereafter. As also mentioned above, rather than manually performing the various machine operations at each of the columnar positions by depression of a control key provided on the machine, each of the control stops 28 may have an abutment, like the abutment 28*a* of the stop 28 in FIG. 4, which rocks the interponent 29 (FIG. 6) to condition the machine for a specific type of machine operation, and in some instances initiate such operation, as controlled by the lever 33 (FIG. 15), which is actuated by the interponent 29. Further details of machine operation under manual and automatic controls may be obtained from the reference patents.

*Improved Machine Mechanism*

(A) *Tabulating finger retaining mechanism.*—Although it is possible to skip a particular column or columns of the record material sheet either by not providing a control stop 28 on the control bar 27 for such column or columns, thereby skipping such column or columns each and every machine operation, or by using a specific tabulating finger camming type of stop, which stop is well known in the art for also skipping a particular column or columns each and every machine operation that it is manually positioned for a skipping operation, it is extremely advantageous to each and every business to provide a means for selectively skipping one or more of the record material columns, if so desired by the machine operator, irrespective of the fact that a control stop 28 has been positioned on the control bar 27 for carriage stopping at each of the data-recording columns contained on the record sheet being used in the machine. In this regard, and looking to FIG. 3, where the typical record sheet 82 is illustrated as having the above-mentioned five columns thereon, it is many times desirable to enter a digit amount in one or the other only of the charge and credit columns thereof, to perhaps not take a balance of a particular day's entries, or to not enter additional reference numbers on the record sheet if such numbers are identical to those of the preceding entry. Also, in some instances, a printing of the date of entry may desirably be dispensed with when more than one accounting operation is performed on the customer's record sheet in any one day. Thus, when a machine operator is using a record material sheet having a fixed number of columns thereon, it is the primary purpose of the following described mechanism to enable the machine operator to selectively skip any one or more of such columns within each line of accounting operations performed on the record material sheet. As also described later, the modified form of the invention (FIG. 15) enables any one or more of such columns to be automatically skipped under control of the movement of the paper carriage during its tabulating operation.

Figure 5:
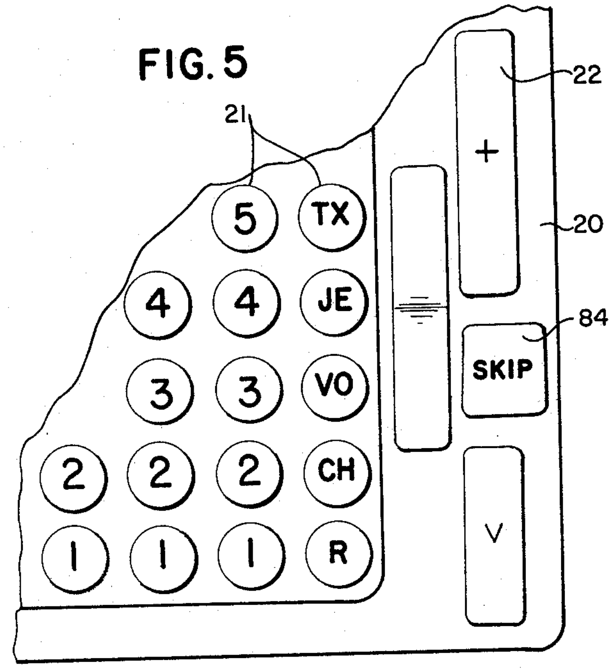
FIG. 5 is a fragmentary view, in top plan, of the lower right-hand corner portion of the keyboard of the accounting machine.

Added to the normal group of control keys provided on the machine is a skip control key 84, herein shown in FIG. 5 as being located forwardly of the add motor bar 22. This skip control key 84 is likewise carried by the above-mentioned control key keyframe unit mounted on the inner side of the machine housing 20, as set out in detail in the above-referred-to United States Patent No. 2,813,611, and as positioned in the overall machine arrangement as illustrated in FIG. 1A. Looking to FIG. 1A, along with FIG. 6 of the reference United States Patent No. 2,813,611, the skip control key 84 is provided with a downwardly-extending stem member 84*a*, slidably supported for vertical movement on a pair of spaced-apart studs 84*b* and 84*c*, and is normally urged upwardly to an undepressed position by means of a spring 84*d*. A rearwardly - and downwardly-extending leg 85 of the stem member 84*a* rests upon a stud 87, carried by a forwardly-extending arm of a skip actuating bell crank 86, which bell crank 86 is rotatably mounted on a stud 88, extending outwardly from the right vertical frame plate 24, at a zone rearwardly of the skip control key 84. An upwardly-extending arm of the bell crank 86 is provided with an L-shaped slot 89, which receives slidingly therein a stud 91, carried by the front end portion (the left end as seen in FIG. 1A) of a skip link 90, extending therefrom rearwardly of the machine to pivotally interconnect the lowermost, turned-over end portion of a crank member 94 (see FIGS. 1B and 6). As seen in both FIGS. 1B and 6, the crank member 94 extends upwardly from the link 90 by a vertical length 94*a*, on the outer side of the frame plate 24, thence inwardly by a horizontal length 94*b* to a zone adjacent but short of the longitudinal center of the machine, and thence upwardly and rearwardly from such length 94*b* to terminate in a free end portion 95, located rearwardly of the frame plates 24 and 25. The support means for the crank member 94 is best seen in FIG. 6, where a crank support bracket 96 is illustrated as being secured by screws 97 to a rear brace member of the machine (such rear brace member not being included in the illustration for the sake of clarity and in view of the usual construction thereof, as set out in the reference patents) for rotatably supporting the horizontal length 94*b* of the crank member 94 by means of spaced-apart, semi-circular guide portions 98 thereof, contacting one circumferential portion of the length 94*b*, and by an opposing but like guide portion 99, contacting an opposite circumferential portion of the crank length 94*b*. By means of a spring 101 (FIG. 1A), stretched between the forward end portion of the link 90 and a frame-carried stud 102, located rearwardly and upwardly from such link end portion, the link 90 is normally urged upwardly to have its stud 91 positioned in the upstanding leg portion of the L-shaped slot 89 in the bell crank 86, and is also normally urged rearwardly for rotating the crank member 94 counter-clockwise within its bracket guide portions 98 and 99, the extent of such counter-clockwise rotation of the crank member 94 being limited by an upturned ear 100 of the crank support bracket 96 (FIG. 1B) engaging the crank member free end portion 95. With such a construction, it is seen that, as the skip control key 84 is depressed to its operating position, its stem leg 85, through the stud 87, causes the bell crank 86 to be rocked counter-clockwise about its pivot 88, in turn, and through the stud 91 and slot 89 interconnection, shifting the link 90 forwardly against the urgence of the spring 101 for rocking the crank member 94 clockwise to have its free end portion 95 move a distance rearwardly from the bracket ear 100. During such counter-clockwise rocking of the bell crank 86, its stud 87 contacts the upper edge of the lever 56, which, through its stud 59, rocks the machine main trip lever 52 clockwise about its pivot 53 for initiating a cycle of machine operation in the usual manner, as set out in detail in the reference patents, and as set out briefly above with reference to machine operation under control of the add motor bar 22.

As mentioned above, during each machine operation initiated by the add motor bar 22, as well as each machine operation initiated by the skip control key 84, now being described, the machine rear drive shaft 84 oscillates first counter-clockwise (FIG. 1B) and then clockwise to actuate the bell crank lever 65 (FIGS. 1B and 4). Such actuation of the bell crank lever 65 causes the tabulating finger 40 to be first raised for releasing the paper carriage for tabulating movement, and then lowered for stopping such paper carriage movement in accordance with the positioning of the next adjacent control stop 28 on the paper carriage control bar 27. A like raising of the tabulating finger 40 is had during each machine operation initiated by the skip control key 84, but, by means of the mechanism now described, such finger is retained in its raised position for skipping the next control stop 28, as well as perhaps other control stops 28 thereafter, as directed by the accounting operation being then performed.

Rotatably mounted on a second shoulder screw or stud 104, extending outwardly from the bracket member 32 at a zone rearward of its shoulder screw 66, is a tabulating finger latch 105, having a forward ear portion 106, a lower shoulder portion 107, and a rearwardly-extending releasing arm position 108 (see FIGS. 1B and 7A). As also seen in such figures, a tabulating finger latch retaining arm 109 is rotatably mounted on the bracket-carried shoulder screw 66, at a zone outward from the bell crank lever 65 thereon, to lie adjacent the tabulating finger latch 105. A lower shoulder portion 110 of such arm 109 is operably associated with the ear portion 106 of the latch 105, while a lower ear portion 111 of the arm 109 is operably associated with the free end portion 95 of the crank member 94, in a manner to cause the arm 109 to be rocked counter-clockwise about its pivot 66 during the clockwise rocking of the crank member 94, as described above. By means of a spring 112, stretched between the members 105 and 109, such tabulating finger latch 105 and its associated retaining arm 109 are yieldingly retained in their normal home positions, as illustrated in FIG. 7A, prior to the clockwise rocking of the crank member 94 and the resultant rearward shifting of its free end portion 95 when the skip control key 84 is depressed for initiating a machine operation. In this normal home position of such members, the latch 105 is prevented from rocking counter-clockwise about its pivot 104 under urgence of the spring 112, in view of the simultaneous clockwise urgence by such spring 112 of the retaining arm 109 and the positioning of its lower shoulder portion 110 under the ear 106 of the latch 105 . This positioning of the members 105 and 109 is retained during each machine operation initiated by the add motor bar 22 or any other control key on the machine, other than the skip control key 84, which, as will now be described, caues the retaining arm 109 to release the tabulating finger latch 105 for a counter-clockwise movement sufficient to latch the tabulating finger 40 when it is raised to its ineffective position during the ensuing machine operation also initiated by such skip control key 84.

Looking now to FIGS. 1B and 4, it is seen that the bell crank lever 65 is provided with a second rearwardly-extending arm 113, having an ear 114 turned over from its outer end portion for operable association with the shoulder portion 107 of the tabulating finger latch 105 (FIG. 7A). For the sake of clarity, it may be stated that this second arm 113, in addition to extending rearwardly from the bell crank lever 65, like its first arm, 67, extends somewhat downwardly to present its ear portion 114 a spaced distance below the roller 68 carried by such first arm 67, as seen in FIG. 1B. As the skip control key 84 is depressed for rocking the crank member 94 clockwise, the free end portion 95 of such crank member 94 is shifted to the rear from its home or rest position, as illustrated in FIGS. 1B and 7A, whereupon it contacts the lower ear 111 of the tabulating finger latch retaining arm 109 and rocks such arm 109 counter-clockwise against the normal urgence of the spring 112 (FIG. 8A). Upon this happening, the lower shoulder portion 110 of the arm 109 is removed from under the ear 106 of the tabulating finger latch 105, which latch 105, under the urgence of the spring 112, is permitted to be rocked counter-clockwise about its pivot 104 until its lower shoulder portion 107 comes into contact with the ear 114 of the bell crank lever 65. As illustrated in FIGS. 7A and 8A, the latch 105 is enabled a slight movement only before being stopped by the bell crank lever 65, as positioned prior to and during the first part of each machine operation; that is, prior to such bell crank 65 being actuated by the mechanism of FIG. 4 for raising the tabulating finger 40 to its control stop ineffective position. As mentioned earlier, the depression of the skip control key 84 also initiates a machine operation in the well-known manner, during which operation the bell crank lever 65 is rocked about its pivot screw 66 to raise the tabulating finger 40 near the end of the machine operation.

Looking now to FIG. 9A, upon such rocking of the bell crank lever 65 for raising the tabulating finger 40, the turned-over ear 114 of its second arm 113 is shifted upwardly to a zone which permits the shoulder portion 107 of the latch 105 to fall thereunder as such latch 105 is rocked farther counter-clockwise unde rthe urgence of the spring 112. Upon such positioning of the members 105, 109, and 65, as illustrated in FIG. 9A, which positioning takes place as the tabulating finger 40 is raised by the rocking of the bell crank lever 65 during a machine operation initiated by the skip control key 84, the tabulating finger 40 is latched in its raised, or ineffective, position, and will remain so latched until released by additional improved mechanism described later herein. When so positioned, such tabulating finger 40 is not effective for stopping the movement of the paper carriage, according to later control stops 28 thereof, until it is again lowered to its affective, control-stop-engaging, position.

As further seen in FIG. 1A, along with FIG. 2, as the full-stroke sector 49 is oscillated first counter-clockwise during each machine operation, a stud **49*a* thereof is moved away from a locking arm 115, which, under the urgence of a spring 118, is rocked counter-clockwise about its pivot stud 117. Upon such rocking of the arm 115, a forward ear 116** thereof is swung downwardly to a position for performing the following skip-key-restoring and interlock functions.

When the machine operation is initiated by the skip control key 84—that is, by the counter-clockwise rocking of the bell crank 86 thereby for rocking the machine main trip lever 52 clockwise (FIG. 1A) to pull the link 90 forwardly—the locking arm ear 116, during its downward movement, contacts the upper surface of an overturned ear 92 of the forwardly-shifted link 90, thereby carrying the forward end of such link 90 downwardly to shift its stud 91 from its normal position within the upturned leg portion of the slot 89 of the bell crank 86. Such stud 91, under urgence of the spring 101, is then pulled immediately within the rearwardly-extending leg portion of the bell crank slot 89 to return the link rearwardly and rock the crank member 94 counter-clockwise for restoring its free end portion 95 (FIG. 1B) to its home, or non-actuating, position against the bracket ear 100. Thus, even though the skip control key 84 is held in its depressed position, thereby causing the machine to repeat its cycling operation, the downward shifting of the stud 91 within the slot 89 of the bell crank 86, during the first machine operation initiated by such key 84, returns the crank member 94 to its home, or non-actuating, position with relation to the tabulating finger latch retaining arm 109, operated thereby. This return to home of the free end portion 95 of the crank member 94 is seen in FIG. 9A, where the bell crank lever 65 is illustrated as being latched by the latch member 105 in its tabulating-finger-raising position.

When, on the other hand, a machine operation is initiated by any one of the remaining control keys on the machine, other than the skip control key 84, the locking arm ear 116, during its downward movement as the full-stroke sector stud **49*a* is moved away from the locking arm 115, becomes positioned behind a downwardly-extending leg portion 93 of the ear 92 on the link 90 to prevent a simultaneous machine operation from being initiated under control of the skip control key 84. With such positioning of the ear 116 with relation to the unshifted link 90—that is, behind the leg 93 of the ear 92 thereof—the skip-control key 84 is locked in its undepressed position as the bell crank 86 and its assocaited link 90 are restrained from their respective counter-clockwise and forward movements. Near the end of the machine operation, in each instance, the ear 116** is returned to its upper, or home, position (FIG. 1A) by the return movement of the full-stroke sector stud 49*a* returning the locking arm 115 clockwise about ts pivot 117.

The modified form of the invention, as thus far described, is illustrated in FIG. 15, where the manually operable crank member 94 (FIG. 1B) is replaced by an upstanding actuating arm 120, secured to the type of operation control lever 33 and having an upper end portion 95*a* operably associated with the lower ear 111 of the tabulating finger latch retaining arm 109. With such modified construction, where the crank member 94 for actuating the retaining mechanism is replaced by the arm 120, the tabulating finger 40 is retained in its raised, or ineffective, position by the positioning of the paper carriage rather than by the manual depression of the skip control key 84. Upon clockwise rocking of the lever 33 by the interponent 29, as described above, the upper end **95*a* of the actuating arm 120 is shifted rearwardly to rock the retaining arm 109 counter-clockwise and enable the latch 105 to be spring-urged counter-clockwise for latching, in the usual manner, the bell crank lever 65 when it is operated to its tabulatnig-finger-raising position. The tabulating-finger-restoring mechanism, as now described in relation to the preferred, or manual, form of the invention, is also available to the modified form of the invention, for returning the tabulating finger 40 to its lower, or effective, position in relation to succeeding control stops 28 provided along the control bar 27** of the machine paper carriage.

(B) *Tabulating finger restoring mechanism.*—Secured to the rear of the machine, immediately behind the bracket member 32, and by means of the spaced-apart mounting bolts 122 therefor, is a second bracket member 123, having an upper planar portion 124 disposed to the left of the main body portion of the bracket 32 (FIG. 6), which portion 124 is provided with a leftwardly-extending horizontal slot 125 therein and which portion 124 terminates in a rearwardly-extending ear 126, disposed to the left of the slot 125 therein (see FIGS. 1B, 6, and 7B). Mounted on this second brack 123, for sliding movement along the outer surface of its upper planar portion 124, is a tabulating finger latch releasing cam 128, having a shouldered stud 129 thereof extending through and slidingly maintained within the slot 125. A spring 130, stretched between the bracket ear 126 and an upper tab portion of the latch-releasing cam 128, normally maintains such cam 128 in its leftmost position; that is, with its stud 129 in abutment with the closed end portion of the bracket slot 125, as illustrated in FIG. 7B. The overall configuration of the latch-releasing cam 128 is such that its right end portion is provided with an outwardly directed and somewhat downwardly inclined ear 131, the lowermost left end portion terminates in a guide tail 132, and its main body portion is provided with a rightwardly-inclined camming slot 133 for receiving the rear end of the releasing arm portion 108 of the tabulating finger latch 105 freely therethrough. The spring 130, in addition to yieldingly urging such cam 128 leftwardly within the bracket slot 125 (FIG. 7B), yieldingly urges the cam 128 counter-clockwise within such slot 125, such counter-clockwise rocking of the cam 128 being prevented by the latch 105 releasing arm portion 108 contacting the lower edge of the cam slot 133 therein when the machine is at home, with its members 105, 109, and 65 positioned as illustrated in FIG. 7A.

Upon depression of the skip control key 84, thereby positioning the members 105, 109, and 65 as illustrated in FIG. 8A, the cam 128 (FIG. 8B) is permitted a slight counter-clockwise movement by the spring 130, as the arm 108 is moved upwardly when the latch 105 is released for the above-mentioned slight counter-clockwise movement about its pivot 104. Then, when the bell crank lever 65 is rocked for raising the tabulating finger 40, thereby enabling the latch 105 to be rocked farther counter-clockwise for presenting its lower shoulder portion 107 under the ear 114 of such lever 65, the cam 128 is permitted further counter-clockwise movement by the spring 130 until its guide tail 132 comes into contact with the upper edge of the guide comb 35 (FIG. 9B), which guide comb is presented in the plane of the cam 128, as seen in FIG. 1B. As the bell crank lever 65 becomes latched in its tabulating finger raising position, as illustrated in FIG. 9A, the releasing arm portion 108 of the latch 105 has moved upwardly from the lower edge of the camming slot 133 of the cam 128 to lie adjacent the rightmost end of an upper cam edge of such camming slot 133 (see FIG. 9B). Although not specifically set out earlier in this specification, it is axiomatic that the bell crank lever 65 does not become latched in its tabulating finger raising position during machine operations initiated by control keys other than the skip control key 84, since, as illustrated in FIG. 7A, the latch 105 is not released for counter-clockwise movement by its associated arm 109 unless the free end portion 95 of the crank member 94 is shifted rearwardly during the initiation of a machine operation. It is, therefore, also axiomatic that the tabulating finger latch releasing cam 128 is permitted the above-described counter-clockwise movements during a machine operation initiated by the skip control key 84, and is not permitted such additional movements during a machine operation initiated by any one of the remaining control keys on the machine.

A final element of the tabulating finger restoring mechanism consists of a release stop 134, which, as described above with reference to the control stop 28, may be selectively secured at desired locations along the paper carriage control bar 27 (FIG. 4). The stop 134 is nonfunctional; that is, it does not itself stop the paper carriage at a certain columnar position, nor does it condition the machine mechanism for performing a specific type of machine operation at a particular columnar position. Rather than this, its primary purpose is confined to the controlling of the tabulating finger restoring mechanism for returning the latching members 105 and 109, as illustrated in FIG. 9A, to their home, or unlatching, positions, as illustrated in FIG. 7A, whereupon the tabulating finger 40 is permitted to lower and again lie in the path of a succeeding control stop 28 for positioning the paper carriage at the columnar position defined thereby. Although the release stop 134 is illustrated herein (FIG. 4) as being structurally different from the control stop 28, it is apparent that both are easily applied to the control bar 27 in the manner well known for such "scissor-type" and "snap-type" stop construction.

As best seen in FIGS. 4 and 15, the release stop 134 is provided with a lower leg portion 135, free of any abutments or extensions for controlling the type of machine operation in any instance. Contrary to the description of the upper leg portion 28B of the control stop 28 (FIG. 4), the upper leg portion 136 of the release stop 134 is of a limited height to present its uppermost edge well below the stop surface 47 of the tabulating finger 40 when such finger 40 is in its lower, or effective, position. Added to such stop 134 is a forward extension or abutment 137 of the upper leg portion 136, which abutment 137, as will now be described, causes the tabulating finger latch releasing cam 128 to be shifted along the bracket portion 124 for releasing the tabulating finger 40 when it is retained in a latched position.

As described above, during each machine operation initiated by the skip control key 84, the latch-retaining arm 109 of FIG. 7A is rocked counter-clockwise, by the free end portion 95 of the crank member 94, to the position illustrated in FIG. 8A, whereupon the tabulating finger latch 105 is urged counter-clockwise by the spring 112 to present its shoulder portion 107 in abutment with the overturned ear 114 of the bell crank lever 65 when in its home, or unoperated, position. Then, as the bell crank lever 65 is rocked counter-clockwise about the pivot 66 (FIG. 1B) during each machine operation initiated by such skip control key 84, its ear 114 is shifted upwardly to become latched by the shoulder portion 107 of the tabulating finger latch 105 (FIG. 9A). Upon such latching of the bell crank lever 65 in its rocked position, the bail 44 (FIG. 4), which has been raised thereby for raising the rear end of the tabulating finger 40, is retained in its raised position against the tension of the spring 42, which normally urges the tabulating finger 40 and the bail 44 to their lower, carriage-stopping, positions. At the same time, as the tabulating finger latch 105 is permitted to be rocked counter-clockwise to first abut the bell crank lever ear 114 (FIG. 8A) and then to latch such bell crank lever 65 by its ear 114 as it is shifted upwardly (FIG. 9A), the above-described tabulating finger latch releasing cam 128 is rocked counter-clockwise by the spring 130 from its home position (FIG. 7B) to the position illustrated in FIG. 8B as the releasing arm portion 108 of the tabulating finger latch 105 is raised upwardly, and then further counter-clockwise until the guide tail 132 of such cam 128 comes into contact with the upper edge of the guide comb 35 as the arm portion 108 of the latch 105 is moved again upwardly to the position just short of contacting the upper cam edge of the camming slot 133 (FIG. 9B).

Figures 10A, 10B, 11A, 11B, 12A, 12B:
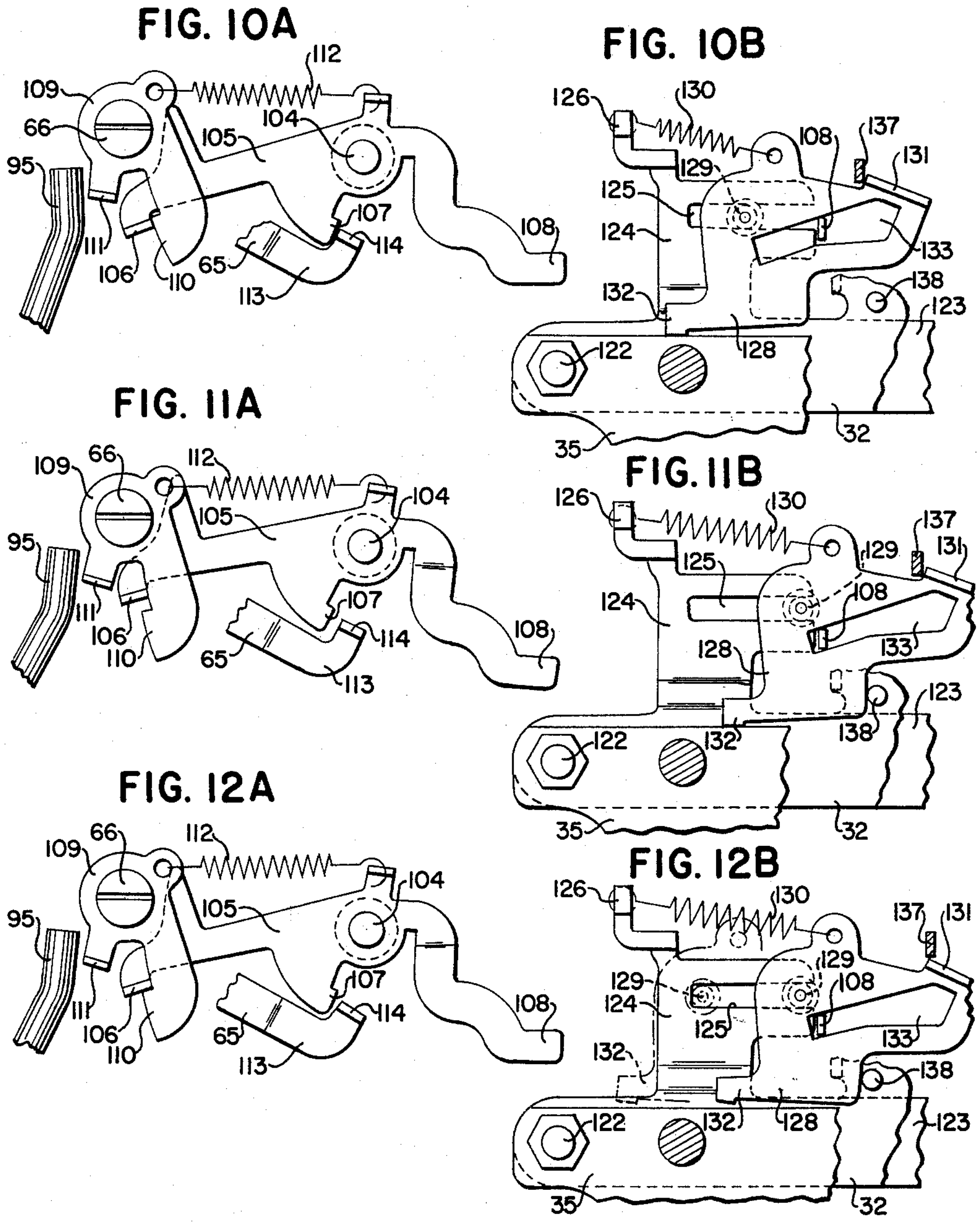
FIG. 10A is a detail of the tabulating finger retaining mechanism as it is being moved toward home, to an unlatching position, by the continued movement of the restoring mechanism as the paper carriage is being tabulated.
FIG. 10B is a detail of the tabulating finger restoring mechanism as positioned by the paper carriage for returning the retaining mechanism of FIG. 10A to its home position.
FIG. 11A is a detail similar to FIG. 10A, but showing the mechanism thereof just prior to its being returned to a home position by further tabulation of the paper carriage.
FIG. 11B is a detail similar to FIG. 10B, but showing the mechanism thereof as positioned by the paper carriage for returning the retaining mechanism to that position illustrated in FIG. 11A.
FIG. 12A is a detail identical with FIG. 7A; that is, showing the tabulating finger retaining mechanism as returned to its home position.
FIG. 12B is a detail similar to FIG. 11B, but showing the mechanism thereof as it is disengaged from the paper carriage and positioned just prior to its being returned to its home position as illustrated in FIG. 7B.

With such positioning of the latching members, as illustrated in FIG. 9A, the tabulating finger 40 is retained in its ineffective, or upper, position, and the paper carriage is free to travel under urgence of its spring reel at the end of the instant machine operation initiated by the skip control key 84; and, when set in motion, such carriage is not stopped at any succeeding columnar positions (determined by the control stops 28) until the tabulating finger is again lowered to its effective position by the releasing mechanism (now positioned as illustrated in FIG. 9B) as it is further actuated by a release stop 134 provided on the control bar 27 at a zone ahead of a control stop 28 programmed for stopping the carriage at the next columnar position. As seen in FIGS. 7B through 9B, as the paper carriage is given its tabulating movement, the release stop 134, like the control stops 28, is carried therewith to the left, as seen from the front of the machine, and to the right, as illustrated herein, when seen from the rear of the machine. During such movement of the release stop 134, its forward extension or abutment 137 comes into contact with the inner edge of the cam ear 131 (when the cam 128 is rocked to the position illustrated in both FIGS. 9B and 10B), carrying the cam 128 therewith and along its guide slot 125 (FIG. 10B) to cause the upper edge of the cam slot 133 to contact and cam the releasing arm portion 108 of the tabulating finger latch 105 downwardly toward its home position. As such portion 108 is contacted and started to be returned to home by the cam slot 133, the ear 114 of the bell crank lever 65 is thereby released from behind the shoulder portion 107 of the latch 105 (FIG. 10A), whereupon such bell crank lever 65 is immediately returned clockwise, as seen in FIG. 1B, and counter-clockwise, as seen in FIG. 4, under the urgence of the spring 42, to lower the tabulating finger 40 to its effective position in relation to the control stops 28 on the carriage control bar 27. As the release stop 134 continues to move with the carriage, its abutment 137 continues to carry the cam 128 to the right (FIG. 11B), during which movement of the cam 128 the arm portion 108 of the latch 105 is returned by the cam slot 133 to its home position (FIG. 7B) and slightly therepast to rock the ear 106 of the latch 105 above its retaining shoulder portion 110 provided on the arm 109 (FIG. 11A).

A stud 138, which extends outwardly from the central portion of the bracket member 32, secured to the rear of the machine (FIGS. 6 and 11B), is engaged by a lower forward edge of the cam 128 when shifted the full extent of its guide slot 125 for returning the tabulating finger latch 105 to its home position. Upon contact of such cam edge with the stud 138, further movement to the right of the release stop abutment 137 causes the cam 128 to be rocked clockwise within the slot 125 (FIG. 12B), since it is prevented by the stud 138 from further shifting therewith, a distance sufficient to release its ear 131 from behind the abutment 137, whereupon the cam 128 is returned immediately to its home position (illustrated in FIG. 7B and also illustrated in phantom in FIG. 12B), under the urgence of the spring 130. As the cam 128 is so released from engagement with the release stop abutment 137 and starts its return movement to home, the releasing arm portion 108 of the tabulating finger latch 105 is permitted a slight upward movement to enable the spring 112 to return the latch 105 to its home position (FIGS. 7A and 12A), where its forward ear portion 106 again contacts the shoulder portion 110 of the tabulating finger latch retaining arm 109.

If, at the next columnar position, as determined by the control stops 28 on the control bar 27 of the paper carriage, the machine operation is initiated under control of the skip control key 84, the tabulating finger 40 again becomes retained in its ineffective position by the mechanism illustrated in detail in FIGS. 7A through 12A, and such tabulating finger 40 again remains in its upper, or ineffective, position, until the next release stop 134 on the control bar 27 actuates the releasing mechanism illustrated in FIGS. 7B through 12B, for restoring the tabulating finger 40 to its effective position while returning the retaining mechanism therefor to its home position. If, on the other hand, the machine operation is initiated by means of any one of the control keys other than the skip control key 84, the tabulating finger 40 is not retained in its ineffective position by the mechanism of FIGS. 7A through 12A, since the bell crank lever 65 is free to operate in its normal manner for raising and lowering the tabulating finger 40, as set out in detail in the reference United States Patent No. 2,813,611, to Nelson R. Frieberg and Oscar F. Larsen. In this instance, the tabulating finger latch releasing cam 128 remains in its home position, as illustrated in FIG. 7B, and does not rock to the position of FIG. 9B for presenting its ear 131 in the path of travel of the next release stop 134 on the carriage control bar 27. Since the release stop 134, in each instance, is non-functional in relation to the tabulating finger 40 when lowered to its effective, carriage-stopping position, the sole purpose of providing such release stops 134 along the control bar 27 is to enable the machine operator to selectively stop the paper carriage at various columnar positions which would ordinarily be skipped if the tabulating finger 40 remains latched in its ineffective, or upper, position by the retaining mechanism actuated during each machine operation initiated by the skip control key 84.

*Typical Operation of Machine Having Improved Mechanism*

In view of the operational description contained in the above-mentioned United States reference Patent No. 2,813,611, along with the hereinabove description relating to the usual mauhine structure and its mode of operation with regard to a record material sheet, as illustrated in FIG. 3, it is apparent that a control stop 28 would be provided on the paper carriage control bar 27 for each of the columnar positions of the record material sheet 82. It is also apparent that, in the absence of the improved mechanism constituting the instant invention as embodied in such a machine as that described generally herein, the tabulating finger 40 is raised near the end of each machine operation initiated by means of any of the usual control keys provided on the machine (such as the add motor bar 22) and is likewise again lowered at the very end of each machine operation for engaging the next control stop 28 shifted theretoward as the carriage is spring-urged to the left during its tabulating operation. Under such conditions, the paper carriage would be stopped at the first columnar position, where the record material sheet 82 may receive a date-printing operation;

be then tabulated to the second columnar position, where such record material sheet 82 may receive a printed record of a reference or account number, as set up on the digit keys 21 and under the usual non-add type of machine operation, which, as described above, may be provided either automatically, by the rocking of a type of operation interponent when the carriage reaches such columnar position, or manually, upon the depression of a non-add control key, as normally provided on the machine; and then be tabulated in a like manner to each of the remaining columnar positions on the record material sheet 82 for including thereon the various printed records called for by the accounting operation being performed. If the particular accounting operation does not call for an item amount to be included in either of the charge or credit columns of such record material sheet 82, the paper carriage is normally tabulated from such column to the next by depression of the add motor bar 22 without an amount being set up on the digit keys 21, thereby causing no printing operation whatsoever to be performed in the particular column being by-passed even though a separate machine operation is required to advance the carriage from the undesired column to the next.

In view of the above-described mechanism operably associated with the skip control key 84, it is apparent that such key 84 performs the machine-tripping function normally associated with the add motor bar 22, in addition to actuating mechanism for retaining the tabulating finger 40 in its ineffective position when it is so raised during the machine operation. Therefore, rather than the carriage's stopping at an undesired columnar position and then advancing therefrom to the next columnar position by means of the add motor bar, as set out above, the undesired columnar position may be skipped entirely as the paper carriage is tabulated at the end of the machine operation initiated by the skip control key 84 (which machine operation is initiated at the columnar position immediately before that column desired to be skipped). Such carriage, as described above, is then stopped at the next or any succeeding columnar position which has a release stop 134 positioned on the control bar 27 ahead of its column-selecting control stop 28. Looking to FIGS. 4 and 6, and assuming that the last machine operation was initiated by the skip control key 84 for causing the tabualting finger 40 to be retained in its upper, or ineffective, position as the paper carrage is being shifted at the end of such machine operation, it is seen that the control stop 28 would not be effective for stopping the carriage at a columnar position defined thereby, but that the next control stop 28A (FIG. 6) would be effective for stopping the carriage movement, in view of the release stop 134 being positioned ahead thereof, for actuating the tabulating finger latch releasing cam 128 and returning the tabulating finger 40 to its lower, effective, position.

Now, assuming that the machine operation initiated by the skip control key 84 is performed at a columnar position defined by the control stop 28 of FIG. 6, the operation of the restoring mechanism is such that the next columnar position, as defined by the control stop 28A, is skipped even though the release stop 134 is positioned on the control bar 27 at a zone immediately behind the control stop 28, and spaced a distance ahead of such stop 28A. With such positioning of the release stop 134 extremely close to the machine function control stop 28 (two or three notch spaces of the control bar therebehind), it is seen, in the diagrammatic illustration of FIG. 13, that the rearwardly-extending abutment 137 of such release stop 134 would lie behind the inner edge of the latch-releasing cam ear 131 when the control stop 28 is in abutment with the tabulating finger 40. Therefore, when the releasing cam 128 is permitted to rock, as described above with relation to FIGS. 8B and 9B, during a machine operation initiated by means of the skip control key 84, the release stop 134 is not effective for releasing the tabulating finger 40 from its upper, ineffective, position, and such tabulating finger 40 is not returned to its effective position until the next release stop 134A, spaced behind the control stop 28A, is moved by the paper carriage into contact with the inner edge of the ear 131 for shifting the cam 128 in the usual manner. Thus, the control stop 28A is skipped by the tabulating finger 40, since it is not lowered to its effective position by the release stop 134, in view of such stop 134 (FIG. 13) being positioned behind the effective edge of the cam ear 131. With a stop 134 being so positioned in relation to the control stop 28, at which stop 28 the instant machine operation is being initiated, it is apparent that the machine operator may skip the very next control or function stop from any given position of the paper carriage. It is also apparent that the release stop 134A may be positioned still farther ahead of the cam 128 than illustrated in FIG. 13, whereupon all control stops provided on the control bar 27 between it and the stop 28 are likewise skipped, along with the control stop 28A.

In a like manner, an additional release stop, such as the release stop 134B, as illustrated in FIG. 14, may be placed immediately ahead of any control stop which it is desired not to skip during any type of accounting operation. With such positioning of the release stop 134B in relation to the control stop 28A of FIG. 14, such control stop 28A may not be accidentally by-passed at any time by the machine operator, since the rearwardly-extending abutment 137 of the stop 134B is always effective for shifting the cam 128 and lowering the tabulating finger 40 prior to its reaching the control stop 28A. As seen in FIG. 14, the release stop 134B is positioned ahead of the effective edge of the cam ear 131 rather than behind it, as was the case with the release stop 134, thereby contacting such edge as the paper carriage is shifted in the direction indicated by the arrow (to the right as viewed from the rear of the machine). In the manner described above in relation to FIG. 13, as the control stop 28A is shifted into abutment with the tabulating finger 40, to the position of control stop 28 of FIG. 13, the release stop 134A immediately thereafter is again not effective for lowering the tabulating finger 40 to stop at the next columnar position when it is raised during a machine operation initiated by the skip control key 84 at the columnar position represented by the control stop 28A. A similar machine operation may be repeated for each of the remaining control stops provided on the control bar 27 for positioning the paper carriage at particular columnar positions of the record material, some of which control stops may be effective at all times for stopping the paper carriage, and some of which control stops may be so effective at selected times only. In accordance with the particular needs of the machine operator, the control bar 27 may be quickly and easily programmed for columnar skipping by placing a release stop 134 thereon immediately behind any one or more of the machine function control stops 28, which control stops 28 may then be selectively skipped by means of the skip control key 84 (FIG. 1A), or in some instances be automatically skipped by means of the type of operation control lever 33 (FIG. 15); and be also programmed for non-columnar skipping by the placing of an additional release stop 134 thereon immediately before any one or more of the machine function control stops 28, which control stops 28 may then not be skipepd at any time, either intentionally or accidentally.

Looking again to FIG. 3, where the record material sheet 82 is illustrated as having five columnar positions for receiving printed data in accordance with a particular type of accounting operation being performed by the machine, the above-mentioned five control stops 28 are provided on the paper carriage control bar 27 for stopping the carriage at each of such columns. Now, incorporating the instant invention with the above example, where the normal desire of each machine operator is to selectively skip any one of the reference, charge, or credit columns of the record material sheet 82, it is apparent that the placing of a release stop 134 immediately behind the control stops defining the date column, the reference column, and the charge column will enable the machine operator to selectively skip any one of the specified columnar positions. It is also apparent that the placing of such a release stop 134 immediately ahead of the control stop 28 defining the balance column of the record material sheet will prevent such balance column from being skipped at any time. Of course, under normal machine operations, the date column is selected during each machine operation regardless of a release stop's being placed therebefore, in view of the normal returning of the tabulating finger 40 to its effective position as the carriage is returned automatically by the usual carriage return mechanism of the above-mentioned United States Patent No. 2,813,611 from its fully-tabulated position to its starting position (from left to right as seen from the front of the machine). Although not specifically illustrated or described herein, when the normal automatic carriage return stop of the mechanism of the above-mentioned United States Patent No. 2,813,611 is not provided on the control bar 27 at a zone behind the control stop defining the last columnar position for returning the paper carriage automatically to its starting position, as above mentioned, the instant invention also enables the first columnar position of a record material sheet, being the date column in FIG. 3, to be skipped when the carriage is returned to its starting position during a machine operation initiated by means of the skip control key 84.

Since the tabulating finger retaining mechanism is actuated for latching such finger in its ineffective position during the machine operation initiated at a column prior to the one desired to be skipped, it is apparent that the machine operator may skip every other column on the record material sheet if a release stop 134 is positioned immediately behind each of the control stops 28 defining the columns. It is also apparent that, even though such mechanism is actuated at such prior column, the machine operator is prohibited from skipping such next column if the control stop 28 therefor is immediately preceded by a release stop 134. Thus, the very next column after a given position of the paper carriage may be selectively skipped by the machine operator under one programming of the control bar 27, as well as any group of columns thereafter under another programming of such control bar 27. "Programming," as used herein, refers to the selective positioning of the release stops 134 along the control bar 27 in relation to the machine function cotnrol stops 28 thereon.

While the form of improved skip tab mechanism illustrated and described herein is admirably adapted to fulfill the objects primarily stated, it is to be understood that it is not intended to confine the invention to the several forms of embodiment disclosed herein for specific manual and automatic operation, for it is susceptible of embodiment in various other forms, all coming within the scope of the claims which follow.

What is claimed is:

1. The combination with an accounting machine having a cyclically-operable main operating means, a tabulating paper carriage for holding a record material, means normally urging said paper carriage in a record-material-working direction, control stops mounted on the carriage in accordance with various work columns on the record material, and a tabulating finger for positioning the carriage to columnar positions defined by the control stops thereon, said tabulating finger being normally moved to a carriage-releasing position and returned to a carriage-arresting position in respect to the control stops during each cycle of operation of said main operating means; of skip tab mechanism comprising manually-operable means for initiating a cycle of operation of said main operating means; a latch member operated by said manual means for retaining said tabulating finger in its carriage-releasing position when so moved by the main operating means, thereby enabling said urging means to drive said paper carriage from the columnar position defined by a carriage positioning control stop toward a columnar position defined by one of the remaining control stops thereafter; latch member release stops mounted on the carriage in relation to said remaining control stops, including a first stop positioned immediately behind said carriage positioning control stop and a second stop positioned immediately behind the next control stop thereafter; a cam member operably associated with said latch member, said cam member being shiftable for restoring said latch member to its unoperated position; means normally urging said cam member in a latch member unrestoring position; and cam member actuating means engageable by said release stops during carriage tabulation for shifting the cam member until said latch member is restored thereby to its unoperated position; said first latch member release stop is positioned beyond said actuating means during carriage arrestment at a columnar position defined by the carriage positioning control stop, being therefore not effective for engaging said actuating means during carriage tabulation toward said next control stop; and said second latch member release stop is positioned ahead of said actuating means during carriage arrestment at said columnar position defined by the carriage positioning control stop, being therefore effective for engaging said actuating means during carriage tabulation beyond said next control stop for restoring the latch member to its unoperated position and releasing said tabulating finger for return movement to its carriage-arresting position in respect to a control stop immediately succeeding said next control stop.

2. The machine of claim 1 including a third latch member release stop positioned immediately ahead of said next control stop; said third stop is also positioned ahead of said cam member actuating means during carriage arrestment at said columnar position defined by the carriage positioning control stop; and said actuating means is engaged thereby during carriage tabulation toward next control stop for shifting the cam member until said latch member is restored to its unoperated position for releasing said tabulating finger for return movement to its carriage-arresting position in respect to said next control stop.

3. The machine of claim 1 including means limiting the extent of shifting of said cam member by said actuating means; said means releasing the cam member actuating means from engagement with each release stop when said cam member is shifted thereby to its latch member restoring position; and said actuating means releasing said cam member to its urging means for return movement thereby to its latch member unrestoring position.

4. In an accounting machine having a cyclically-operable main drive means, a traveling paper carriage, control stops mounted on the carriage to establish various positions which the carriage may assume, carriage-tabulating means, control means operable by said main drive means for moving said tabulating means to a carriage-shifting position and returning it to a carriage-stopping position with respect to said control stops during each machine operation, and means for driving said paper carriage in a tabulating direction when said tabulating means is operated by said control means, thereby positioning the carriage to positions defined by the control stops thereon, the combination therewith of means for retaining the tabulating means when moved to a carriage-shifting position, said retaining means being settable from an ineffective position to an effective position for latching said control means when operated by said main drive means; means normally urging said retaining means toward its effective position; latch arm means normally maintaining said retaining means in its ineffective position; means for initiating a cycle of operation of said main drive means; means operated by said cycle-initiating means for overcoming said latch arm means, whereupon said urging means moves said retaining means to its effective position; an additional stop mounted on the paper carriage; and means operable by said additional stop during carriage travel for releasing said retaining means and enabling said tabulating means to return to its carriage-stopping position with respect to the next control stop thereafter.

5. The machine of claim 4 including rockable link means yieldingly interconnecting said latch-arm-overcoming means with said cycle-initiating means; means normally urging said link means to a connected position in relation to said cycle-initiating means for operating said overcoming means; and means operated by the drive means during each machine operation initiated by said cycle-initiating means for rocking said link means to a disconnecting position in relation to said cycle-initiating means, thereby enabling said link-urging means to move said link means to a disconnected position in relation to said cycle-initiating means for restoring said overcoming means to an unoperated condition.

6. In an accounting machine having a cyclically-operable main drive means, a traveling paper carriage, control stops mounted on the carriage to establish various positions which the carriage may assume, carriage-tabulating means, control means operable by said main drive means for moving said tabulating means to a carriage-shifting position and returning it to a carriage-stopping position with respect to said control stops during each machine operation, and means for driving said paper carriage in a tabulating direction when said tabulating means is operated by said control means, thereby positioning the carriage to positions defined by the control stops thereon, the combination therewith of means for retaining the tabulating means when moved to a carriage-shifting position, said retaining means comprising a latch member settable from an ineffective position to an effective position for latching said control means when operated by said main drive means; means for initiating a cycle of operation of said main drive means; latch arm means operated by said cycle-initiating means for setting said latch member in its effective position; a cam member interconnected with said latch member and being operable from an ineffective position to an effective position for returning said latch member to its ineffective position; means normally urging said cam member toward its ineffective position; and a tabulating means release stop, mounted on the paper carriage for operating said cam member to its effective position when shifted thereagainst during carriage tabulation.

7. The machine of claim 6 including a machine rear bracket member; said cam member being laterally shiftable from its ineffective position to its effective position along said bracket member; said urging means normally urging said cam member in a direction opposite to the tabulating direction of said paper carriage; said cam member being provided with a latch member restoring edge; said latch member, when set in its effective position, engaging the restoring edge of said cam member; and said release stop, when shifted against said cam member, overcoming said urging means and moving said cam member therewith in a tabulating direction for causing the restoring edge thereof to return said latch member to its ineffective position.

8. The machine of claim 7 in which the said cam member is also rockable on said bracket member; and means is provided for limiting the extent of lateral shifting movement of said cam member by said release stop; said limiting means comprising an abutment engageable by said cam member when shifted a distance sufficient to return said latch member to its ineffective position; and said abutment rocking said cam member when shifted any distance therebeyond for releasing said cam member from said release stop, thereby enabling said urging means to return said cam member to its ineffective position.

9. A skip tab mechanism for an accounting machine having a main drive means, means for initiating an operation of said drive means, a traveling paper carriage, control stops mounted on the carriage to establish various positions which the carriage may assume, and tabulating means operable from engagement with one control stop and returned for engagement with a next control stop during each operation of said drive means, permitting the carriage to travel to a position defined by such next control stop; comprising a latch member operable from a normally ineffective position to an effective position for retaining the tabulating means when operated from engagement with said one control stop, additional means for initiating an operation of said drive means; latch arm means operated by said additional means for operating said latch member from its ineffective position to its effective position; a tabulating means release stop adjustably mounted on the carriage with respect to the control stops thereon; and cam means operable from a normally ineffective position to an effective position for restoring said latch member to its ineffective position when engaged by said release stop during carriage travel, whereupon said tabulating means may return for engagement with that control stop first located after said release stop.

References Cited in the file of this patent

UNITED STATES PATENTS

| | | |
|---|---|---|
| 1,942,216 | Muller | Jan. 2, 1934 |
| 2,318,448 | Anderson | May 4, 1943 |